(12) United States Patent
Shim et al.

(10) Patent No.: US 10,173,347 B2
(45) Date of Patent: Jan. 8, 2019

(54) OPTICAL LENS, OPTICAL LENS PRODUCTION DEVICE AND PRODUCTION METHOD

(71) Applicant: G&I Solution, Seoul (KR)

(72) Inventors: Patrick Yongshig Shim, Seoul (KR); Min Ho Lee, Seoul (KR)

(73) Assignee: G & I SOLUTION, Seoul (KR)

( * ) Notice: Subject to any disclaimer, the term of this patent is extended or adjusted under 35 U.S.C. 154(b) by 269 days.

(21) Appl. No.: 14/913,495

(22) PCT Filed: Jul. 23, 2014

(86) PCT No.: PCT/KR2014/006673
§ 371 (c)(1),
(2) Date: May 13, 2016

(87) PCT Pub. No.: WO2015/026054
PCT Pub. Date: Feb. 26, 2015

(65) Prior Publication Data
US 2016/0297107 A1    Oct. 13, 2016

(51) Int. Cl.
| | | |
|---|---|---|
| *B29C 33/40* | (2006.01) |
| *B29C 33/38* | (2006.01) |
| *B29D 11/00* | (2006.01) |
| *B29C 45/26* | (2006.01) |
| *B29C 45/27* | (2006.01) |
| *B29L 11/00* | (2006.01) |

(52) U.S. Cl.
CPC ........ *B29C 33/405* (2013.01); *B29C 45/2608* (2013.01); *B29C 45/27* (2013.01); *B29D 11/0048* (2013.01); *B29C 33/3828* (2013.01); *B29K 2995/0027* (2013.01); *B29L 2011/0016* (2013.01)

(58) Field of Classification Search
CPC ....... B29C 33/405; B29C 33/42–33/44; B29C 45/2608; B29C 45/27; B29D 11/00365; B29D 11/00413; B29D 11/0048–11/00586; B29D 11/02
See application file for complete search history.

(56) References Cited

U.S. PATENT DOCUMENTS

| | | | | |
|---|---|---|---|---|
| 3,871,803 | A | * | 3/1975 | Beattie .................... B29C 33/00 249/82 |
| 5,185,107 | A | * | 2/1993 | Blake .................... A61F 2/1613 156/182 |
| 6,099,764 | A | | 8/2000 | Su et al. |

FOREIGN PATENT DOCUMENTS

| | | |
|---|---|---|
| CN | 1351538 A | 5/2002 |
| JP | 06-059104 A | 3/1994 |
| KR | 10-2001-0113041 A | 12/2001 |

(Continued)

OTHER PUBLICATIONS

First Office Action, Chinese Application No. 201480046739.4, dated Feb. 3, 2017, State Intellectual Property Office of the P.R.C.

*Primary Examiner* — Lisa L Herring
(74) *Attorney, Agent, or Firm* — Fish IP Law, LLP

(57) ABSTRACT

An optical lens production device according to an exemplary embodiment of the present invention includes: an upper mold which has one or more upper cavity areas for forming an optical lens; a lower mold which has one or more lower cavity areas for forming the optical lens; and an elastic member which is formed between the upper mold and the lower mold.

9 Claims, 10 Drawing Sheets

(56) References Cited

FOREIGN PATENT DOCUMENTS

| KR | 10-2005-0033987 A | 4/2005 |
|----|-------------------|--------|
| KR | 10-2010-0042226 A | 4/2010 |
| KR | 10-2012-0064203 A | 6/2012 |

\* cited by examiner

OPTICAL LENS, OPTICAL LENS PRODUCTION DEVICE AND PRODUCTION METHOD

This application is a U.S. Nation Phase of claims priority to PCT/KR14/06673, filed Jul. 23, 2014, which claims the benefit of priority to Korean Application Nos. KR 10-2014-0090604, KR 10-2014-0090616, and KR 10-2014-0090624 all filed Jul. 17, 2014, and Korean Application Nos. KR 10-2013-0100651 and KR 10-2013-0100652, both filed Aug. 23, 2013.

FIELD OF THE INVENTION

The present invention relates to an optical lens, and more particularly, to a production device and a production method for efficiently producing an optical lens.

BACKGROUND OF THE INVENTION

An optical lens refers to an object which is made of a transparent material in order to collect or distribute light. The optical lens may be produced by a method of forming a desired shape by polishing an object made of a transparent material (e.g., glass or crystal).

Recently, an optical lens production method has been introduced, which produces an optical lens by melting a polymeric compound such as plastic and injecting the polymeric compound into a mould. In the case of the plastic injection molding method, a cavity, which is formed to correspond to a shape of a desired lens, is present in the mould, and an injection machine injects a molten plastic resin into the mould through a sprue. The injected molten plastic resin is received in the cavity in the mould, and then cooled. After the plastic is completely cooled, the plastic has a shape corresponding to the shape of the cavity, such that the optical lens is produced.

In the case of the optical lens production method using the plastic injection molding, a birefringence phenomenon may occur in the plastic, which defines the optical lens, because of a difference in cooling speed of the molten plastic resin. To reduce the birefringence phenomenon caused by a difference in cooling speed of the plastic resin, injection pressure of resin may be increased, or a temperature of the mould may be kept high, but this method decreases a production speed, and thus degrades productivity.

Meanwhile, a photocurable resin refers to a synthetic organic material which is cross-linked and cured by receiving light energy such as ultraviolet (UV) rays or electron beams (EB). The resin, which is curable by an ultraviolet ray, is called an ultraviolet ray curable resin, and the resin, which is curable by an electron beam, is called an electron beam curable resin. As an alternative to the optical lens production method using the injection molding of the plastic resin, a method of producing an optical lens using a photocurable resin has been developed. Korean Patent Application Laid-Open No. 10-2010-0088480 discloses a method of producing an optical lens using an ultraviolet ray curable resin.

In a case in which the optical lens is produced by using the photocurable resin, there is a need for a production method which efficiently produces the optical lens and obtains a high yield.

SUMMARY OF THE INVENTION

Technical Problem

The present invention has been made in consideration of the aforementioned situations, and an object of the present invention is to provide an optical lens production method and an optical lens production device, which efficiently increase a yield of an optical lens to be produced by an optical lens production method using a photocurable resin.

Technical Solution

To achieve the aforementioned object, an optical lens production device according to an exemplary embodiment of the present invention includes: an upper mould which has one or more upper cavity areas for forming an optical lens; a lower mould which has one or more lower cavity areas for forming the optical lens; and an elastic member which is formed between the upper mould and the lower mould.

In addition, an optical lens production method according to another exemplary embodiment of the present invention includes: disposing an upper mould which has one or more upper cavity areas for forming an optical lens; disposing a lower mould which has one or more lower cavity areas for forming the optical lens; and disposing an elastic member between the upper mould and the lower mould.

In addition, an optical lens production device according to yet another exemplary embodiment of the present invention includes: an upper mould which has one or more upper cavity areas for forming an optical lens; a lower mould which has one or more upper cavity areas for forming the optical lens; and an elastic portion which is formed to encompass at least a part of an extended line of an outer surface of the upper mould or the lower mould.

Advantageous Effects

The optical lens production method and the optical lens production device according to the exemplary embodiment of the present invention may increase a yield of the optical lens by efficiently producing the optical lens, thereby improving productivity of the optical lens production method.

The effects of the present invention are not limited to the aforementioned effects, and other effects, which are not mentioned above, will be clearly understood by those skilled in the art from the following description.

BRIEF DESCRIPTION OF DRAWINGS

Various aspects will now be described with reference to the drawings, and similar reference numerals are used to generally denote similar constituent elements. In the following exemplary embodiments, for the purpose of description, multiple particular details are presented to provide overall understanding of one or more aspects. However, it is apparent that the aspect(s) may be carried out without the particular details. In other exemplary embodiments, publicly known structures and apparatuses are illustrated in the form of a block diagram in order to easily describe one or more aspects.

DETAILED DESCRIPTION

Figure 1:
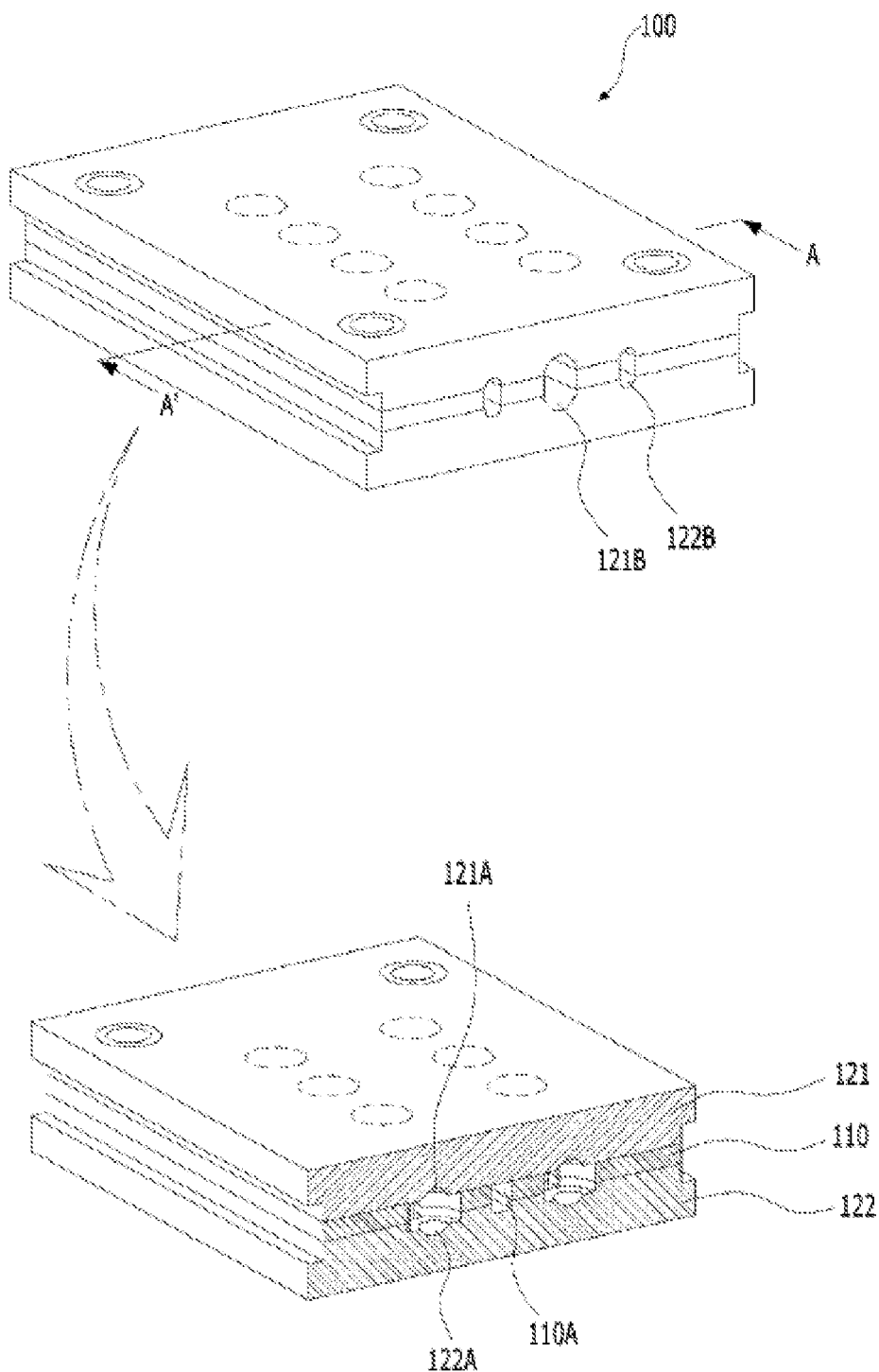
FIG. 1 is a view illustrating a layered structure of an optical lens production device according to an exemplary embodiment of the present invention.

Various exemplary embodiments and/or aspects will now be disclosed with reference to the drawings. A plurality of detailed matters will be disclosed for helping overall understanding of one or more aspects for the purpose of description in the following description. However, it will also be recognized by a person with ordinary skill in the art to which the present invention pertains that these aspects can be implemented without such detailed matters. Hereinafter, specific exemplary aspects for one or more aspects will be described in detail in the following description with reference to the accompanying drawings. However, these aspects are illustrative only, and various methods in principles for various aspects can be partially used, and the following description is intended to include all the aspects and equivalents thereto.

In addition, various aspects and features will be presented by a system that may include a plurality of devices, components and/or modules. It should also be understood and appreciated that various systems, additional devices, components, and/or modules may be included, and/or all of the devices, the components, and the module, which are discussed in connection with the drawings, may not be included.

It may not be construed that the terms "exemplary embodiment", "example", "aspect", and "illustrative example" used in the present specification are better than or have advantages compared to any disclosed aspect, an aspect having a different design, or designs.

Further, the term "or" is intended to mean an inclusive "or" rather than an exclusive "or." In other words, unless otherwise defined or unless the context clearly indicates otherwise, the expression "X uses A or B" is referred to as any one of natural inclusive permutations. That is to say, if X uses A, X uses B, or X uses both A and B, "X uses A or B" satisfies any embodiments mentioned above. It will be further understood that the term "and/or" used herein refers to and includes all possible combinations of one or more of the associated listed items.

It will be further understood that the terms "comprises (includes)" and/or "comprising (including)" used herein mean the presence of stated features and/or constituent elements, but do not exclude the presence or addition of one or more other features, constituent elements and/or groups thereof. Further, unless otherwise specified or if it is contextually unclear that the term indicates a singular form, it should be understood that a singular form in the present specification and the claims generally means "one or more".

An optical lens production method and an optical lens production device according to an exemplary embodiment of the present invention may produce an optical lens by using a photocurable resin which is cured by photopolymerization. In the optical lens production device according to the exemplary embodiment of the present invention, a cavity, which corresponds to a shape of a lens to be produced, is formed in a transparent (or semi-transparent) mould. In addition, the optical lens production device may include a resin injection unit which injects a photocurable resin into the cavity. The photocurable resin is injected into the cavity by an injection apparatus, and the optical lens production device may include an exposure apparatus which radiates light (e.g., an ultraviolet (UV) ray) that cures the photocurable resin during an exposure process. The photocurable resin injected into the cavity is cured through polymerization by light radiated from the exposure apparatus, and as a result, the optical lens may be formed.

The types of photocurable resins used for the optical lens production method according to the exemplary embodiment of the present invention are listed in the following Table 1.

TABLE 1

| | Classification | |
| --- | --- | --- |
| Components | Radical Polymerization Type | Cationic Polymerization Type |
| oligomer | polyester acrylate - epoxy acrylate - urethane acrylate - polyether acrylate - silicon acrylate | alicyclic epoxy resin - glycidyl ether epoxy resin - epoxy acrylate - vinyl ether |
| monomer | mono-functional or multi-functional monomer | epoxy based monomer - vinyl ethers - annular ethers |
| photo-polymerization Initiator | benzoin ethers - amines | diazonium salt - iodonium salts - sulfonium salt - metallocene compound |
| Additive | tackifier, filler, and polymerization inhibitor, etc. | silane coupling agent |

In a case in which a low viscosity monomer is used among the photocurable resins, fluidity of the resin becomes good. In a case in which an optical lens is produced by a method of injecting molten plastic resin in the related art, high viscosity molten plastic is typically used. In this case, since fluidity is not good because of a high viscosity of the resin, birefringence occurs or a non-uniform optical lens is produced during a curing (cooling) process, and as a result, productivity may deteriorate. However, in a case in which a low viscosity monomer is used like the exemplary embodiment of the present invention, fluidity is improved because of low viscosity of the resin, thereby solving the aforementioned drawbacks.

In addition, in the case of the optical lens production method using the photocurable resin, all processes of producing a lens, which include a process of curing the resin, may be carried out at a room temperature. In this case, a lightweight and inexpensive material such as transparent plastic may be used as a material of a mould to be used to produce the optical lens, thereby reducing investment costs for production facilities.

FIG. 1 is a view illustrating a layered structure of a lens forming unit 100 of an optical lens production device according to an exemplary embodiment of the present invention.

The layered structure of the lens forming unit 100, which is illustrated in FIG. 1, is for an illustration purpose, and only some layers, among the layers illustrated in FIG. 1, may constitute the lens forming unit 100 in accordance with the exemplary embodiment of the present invention, or layers, which are not illustrated in FIG. 1, may be added to constitute the lens forming unit 100.

Although not illustrated in FIG. 1, the optical lens production device may further include other constituent elements in addition to the lens forming unit 100 as described above. For example, the optical lens production device may further include an exposure apparatus (not illustrated) including light sources which emit light after the photocurable resin is injected into the lens forming unit 100. In addition, the optical lens production device may further include a resin injection unit (not illustrated) for injecting the photocurable resin into the lens forming unit 100.

As illustrated in FIG. 1, the lens forming unit 100 may include an elastic member layer 110, upper and lower mould layers 121 and 122, a coating resin layer 130, and a quartz plate layer 140

The elastic member layer 110 may be formed by using a member having elasticity so that the member may be contracted by external force and may return to its original shape when the external force is removed. For example, when the elastic member layer 110 receives external force in a height direction of the lens forming unit 100, a thickness of the elastic member layer 110 may be reduced. The elastic member layer 110 may be formed by using a member having elastic force, such as rubber or synthetic rubber. The elastic member layer 110 may be formed by using a non-porous member so that the photocurable resin injected into the lens forming unit 100 does not leak.

As illustrated in FIG. 1, the elastic member layer 110 may define one layer in which the remaining portion, except for a passageway through which the resin flows into the lens forming unit 100, is entirely formed as an elastic member. Alternatively, the elastic member layer 110 may be formed along a boundary of a passageway and formed to encompass the boundary of the passageway through which the photocurable resin moves inside the elastic member layer. For example, the elastic member layer may be formed to encompass a boundary between an upper cavity area and a lower cavity area. The exemplary embodiment in which the elastic member layer 110 is formed along a boundary of a movement route of the resin will be described in more detail with reference to FIG. 2B.

As illustrated in FIG. 1, the lens forming unit 100 may include the upper mould 121 and the lower mould 122.

The upper mould 121 and the lower mould 122 may include an upper cavity area 121A and a lower cavity area 122B, respectively, which have a vacant space formed to correspond to a shape of a lens to be produced.

The upper cavity area 121A and the lower cavity area 122A may be connected with a passageway through which the photocurable resin is transferred so that the photocurable resin may be injected into the upper cavity area 121A and the lower cavity area 122A, respectively. The passageway through which the photocurable resin is transferred may be called a channel. A portion where the upper cavity area 121A and the lower cavity area 122A are connected with the channel may be called a gate. The gate may have a smaller cross-sectional area than the channel.

The upper mould 121 and the lower mould 122 may be configured by a transparent medium or a semi-transparent medium. The upper mould 121 and the lower mould 122 may be configured by a medium which light (e.g., ultraviolet ray) having a wavelength, which at least promotes a process of curing the photocurable resin, may penetrate.

As illustrated in FIG. 1, the lens forming unit 100 may further include the coating resin layer 130, and the quartz plate layer 140. The quartz plate layer 140 may be substituted with a glass layer. Similar to the upper mould 121 and the lower mould 122, the coating resin layer 130 and the quartz plate layer 140 may also be configured by a transparent medium or a semi-transparent medium.

Although not illustrated in FIG. 1, the lens forming unit 100 may further include a scattering layer (not illustrated) which prevents light (e.g., ultraviolet ray) from being concentrated on a part of the photocurable resin accommodated in the upper and lower cavity areas 121A and 122A. For example, the scattering layer may be formed as a layer of an adhesive used to attach the quartz plate layer 140 to other layers. In addition, the scattering layer may be formed of a layer of a scattering material applied onto the lens forming unit 100, a scattering material coating, or a scattering tape.

Otherwise, a scattering material may be dispersed onto on at least one of the upper and lower moulds 121 and 122 without further including the separate scattering layer.

Figure 2A:
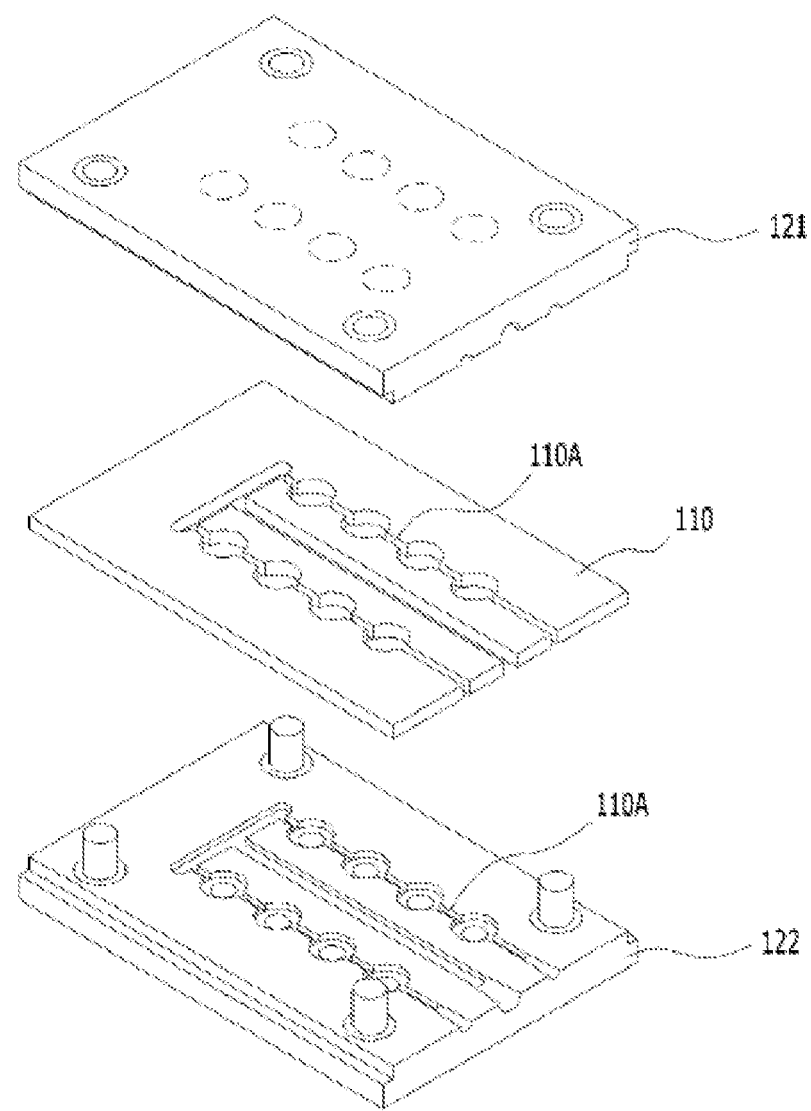
FIG. 2A is a view concretely illustrating a part of the layered structure of the lens forming unit of the optical lens production device according to the exemplary embodiment of the present invention.

FIG. 2A is a view concretely illustrating a part of the layered structure of the lens forming unit of the optical lens production device according to the exemplary embodiment of the present invention.

For ease of description, FIG. 2A merely illustrates the elastic member layer 110, and the upper and lower mould layers 121 and 122. As illustrated in FIG. 2A, the upper cavity area 121A may be formed in the upper mould 121. As described above, the upper cavity area 121A may mean a vacant space formed to correspond to a shape of a lens to be produced. Further, the upper mould 121 may have a resin inlet 121B into which the photocurable resin injected from the resin injection unit (not illustrated) flows. The resin inlet 121B may be called a sprue. While the resin inlet 121B is illustrated in FIG. 2A as being formed in the upper mould 121, the resin inlet 121B may be formed in the lower mould 122. In addition, the resin inlet 121B may be formed at a lateral side of the lens forming unit 100.

As illustrated in FIG. 2A, the elastic member layer 110 may be formed between the upper mould 121 and the lower mould 122. A channel 110A, which allows the resin injected through the resin inlet 121B to flow into the upper cavity area 121A or the lower cavity area 122A, may be formed in the elastic member layer 110.

While FIG. 2A illustrates that the channel 110A is formed in the elastic member layer 110, the channel 110A may be formed at various locations such as the upper mould 121 or the lower mould 122 in accordance with a design variation.

As illustrated in FIG. 2A, the elastic member layer 110 may be formed as one layer that encompasses the channel through which the photocurable resin moves. A thickness of the elastic member layer 110 may be determined in consideration of a contraction percentage of the photocurable resin to be used to produce an optical lens, and an elastic modulus of a material that constitutes the elastic member layer 110.

The lower mould 122 may include the lower cavity area 122A.

As illustrated in FIG. 2A, the one or more upper or lower cavity areas 121A and 122B may be connected to each other through the channels 110A. By sharing the channel 110A, the photocurable resin, which is injected through the one resin inlet 121B, may be injected into two or more cavity areas through the channels 110A.

Figure 2B:
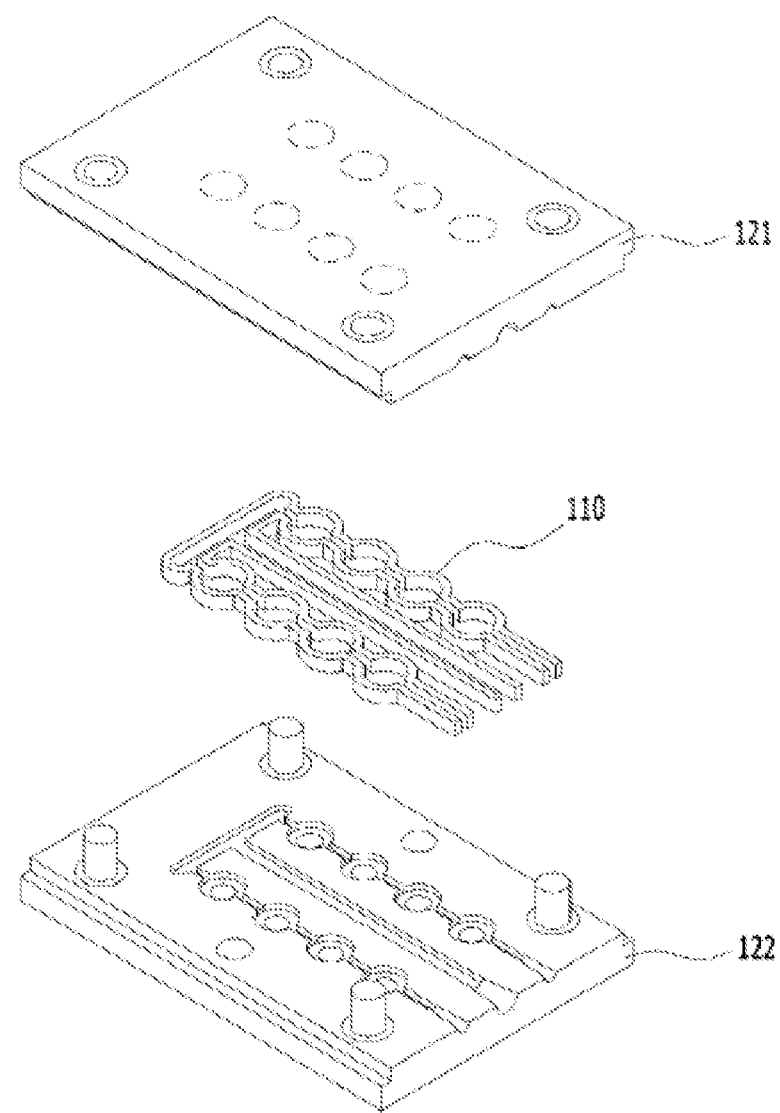
FIG. 2B is a view concretely illustrating a part of a layered structure of a lens forming unit of an optical lens production device according to another exemplary embodiment of the present invention.

FIG. 2B is a view concretely illustrating a part of a layered structure of a lens forming unit of an optical lens production device according to another exemplary embodiment of the present invention.

In FIG. 2B, the elastic member layer 110 is formed to encompass the channel 110A, but no elastic member may be present at portions except for the portion that encompasses the channel 110A. As illustrated in FIG. 2B, the elastic member layer 110 may be formed to encompass the portion, which encompasses the channel 110A, and a boundary between the upper and lower cavity areas 121A and 122A. As a result, it is possible to prevent abuse of unnecessary elastic members, and to compress the elastic member layer 110 even with a small amount of external force.

Figure 3A:
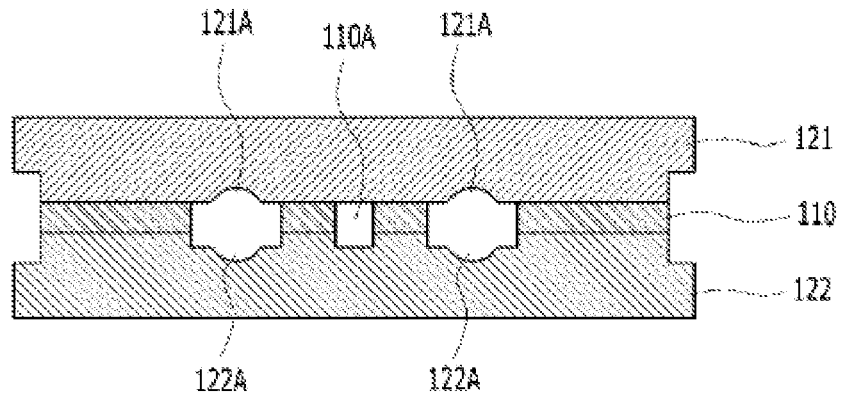
FIG. 3A is a cross-sectional view of a part of the layered structure of the lens forming unit illustrated in FIG. 2A.

FIG. 3A is a cross-sectional view of a part of the layered structure of the lens forming unit illustrated in FIG. 2A.

For description, FIG. 3A illustrates only a state in which the set of two upper and lower cavity areas 121A and 122A is connected to each other through the one channel 110A. For description, the resin layer 130 and the quartz plate layer 140 are omitted, but these layers may be added in accordance with a design.

As illustrated in FIG. 3A, a space, which may be filled with the photocurable resin injected into the lens forming unit 100 through the resin inlet 121B, may be present in the lens forming unit 100. In the lens forming unit 100, the resin inlet 121B, the channel 110A, and the upper and lower cavity areas 121A and 122A may be filled with the resin.

When the resin injection unit (not illustrated) injects the photocurable resin into the lens forming unit 100 through the resin injection unit 121B, the photocurable resin is transferred in the lens forming unit 110 through the channel 110A. The upper and lower cavity areas 121A and 122A are filled with the transferred photocurable resin. The channel 110A through which the photocurable resin is transferred may be encompassed by the elastic member layer 110.

In an exposure step to be described below, when the photocurable resin injected into the lens forming unit 100 is exposed to light and cured, a volume of the photocurable resin injected into the lens forming unit 100 is decreased due to photopolymerization. In other words, as the photocurable resin in a liquid phase is cured to be in a solid phase, an overall volume of the photocurable resin is decreased, and as a result, volumes of the photocurable resins in the lens forming unit 100 are decreased.

A void may be formed in the lens forming unit 100 as a volume of the photocurable resin is decreased. The void means a vacant space encompassed by the photocurable resin, and may cause a deterioration in optical performance of the optical lens. Therefore, there is a need for an optical lens production device capable of removing the void or at least reducing the void.

In the optical lens production device according to the exemplary embodiment of the present invention, the elastic member layer 110, which is a part of the lens forming unit 110, may be contracted by external force so as to inhibit the formation of the void by compensating for the contraction of the photocurable resin.

The external force, which contracts the elastic member layer 110, may be force generated when a volume of the photocurable resin is decreased to compress the elastic member layer, or may be pressure exerted on the elastic member layer 110 in a longitudinal direction from the outside. For example, the optical lens production device according to the exemplary embodiment of the present invention may further include a pressing apparatus (not illustrated) which exerts force on the elastic member layer 110 so as to compress the elastic member layer 110 in a height direction. The pressing apparatus (not illustrated) may be configured by using a spring.

As described above, a thickness of the elastic member layer 110 may be determined at least partially based on a contraction percentage of the photocurable resin and an elastic modulus of the elastic member. In other words, the external force, which is exerted on the elastic member layer 110 as a volume of the photocurable resin is decreased depending on a degree to which the photocurable resin is contracted during a process of curing the photocurable resin, may be calculated. In addition, a thickness of the elastic member layer 110 may be determined according to an elastic modulus of the elastic member, which constitutes the elastic member layer 110, so that the elastic member layer 110 may be compressed to an appropriate degree in order to prevent a void from being formed in the optical lens. For example, the elastic member layer 110 may be designed to receive external force so that the elastic member layer 110 is deformed by about 20% within an elastic range, and in this case, a thickness of the elastic member layer 110 may be determined depending on an elastic modulus of the elastic member and a degree to which the photocurable resin is contracted.

Figure 3B:
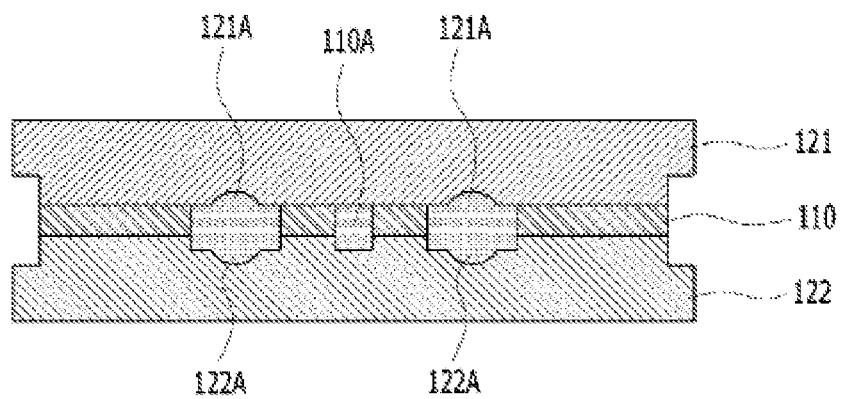
FIG. 3B is a view illustrating a state in which an elastic member of a part of the layered structure of the lens forming unit illustrated in FIG. 3A is compressed.

FIG. 3B is a view illustrating a state in which the elastic member layer 110 is compressed by external force as the photocurable resin is cured.

As illustrated in FIG. 3B, when the elastic member layer 110 is compressed, a volume of a space formed in the lens forming unit 110 is decreased. As a volume of the photocurable resin is decreased according to a contraction percentage of the photocurable resin, the space formed in the lens forming unit 110 is reduced corresponding to the decrease in volume of the photocurable resin, and as a result, it is possible to reduce a probability that a void will be formed due to a decrease in volume of the photocurable resin when the photocurable resin is contracted.

As described above, when the photocurable resin is injected into the lens forming unit 100 and the upper and lower cavity areas 121A and 122A are filled with the photocurable resin, the exposure step for curing the photocurable resin may be carried out. According to the exemplary embodiment of the present invention, the resin injection apparatus (not illustrated) may completely inject the resin prior to performing the exposure step. According to some exemplary embodiments, the resin injection apparatus (not illustrated) may continuously inject the photocurable resin through the resin inlet 121B even after the exposure step is performed.

As described above, when the photocurable resin is cured as the exposure process is carried out, an overall volume of the photocurable resin injected into the lens forming unit 110 is decreased. When the elastic member layer 110 is present, the elastic member layer 110 is compressed due to a decrease in volume of the photocurable resin as described above, thereby reducing the formation of the void.

However, even in this case, in order to further reduce a probability that a void will be formed in the optical lens, the photocurable resin is continuously injected even during the exposure process such that a decrease in volume caused by the contraction of the photocurable resin may be supplemented by a newly injected photocurable resin.

Figure 3C:
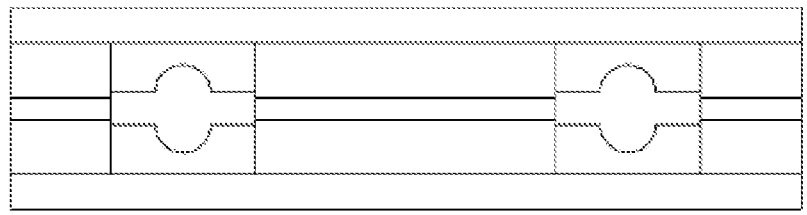
FIG. 3C is a cross-sectional view of a part of the layered structure of the lens forming unit of the optical lens production device according to another exemplary embodiment of the present invention.

FIG. 3C is a cross-sectional view of a part of the layered structure of the lens forming unit of the optical lens production device according to another exemplary embodiment of the present invention.

As illustrated in FIG. 3C, the upper mould 121 and the lower mould 122 may be formed only at portions that include the upper cavity area 121A and the lower cavity area 122A. In other words, the upper mould 121 and the lower mould 122 may be positioned so as to form the upper and lower cavity areas 121A and 122A, and an upper plate 121C and a lower plate 122C, which fix the upper mould 121 and the lower mould 122, may be positioned at the other regions. That is, as illustrated in FIG. 3C, accommodating holes, which may accommodate the upper mould 121 and the lower mould 122, respectively, are formed in the upper plate 121C and the lower plate 122C, and the upper mould 121 and the lower mould 122 are disposed in the accommodating holes, thereby forming the upper cavity area 121A and the lower cavity area 122A, The upper layer 121C and the lower layer 122C may be made of a material having elastic force.

Since the upper layer 121C and the lower layer 122C are made of a material having elastic force, the upper layer 121C and the lower layer 122C may be compressed as the elastic member layer 110 is contracted. In other words, the elastic member layer 110 exerts pressure on the upper layer 121C and the lower layer 122C by being contracted, and as a result, the upper layer 121C and the lower layer 122C may be compressed.

In this case, an interval between the upper mould 121 and the lower mould 122, which are positioned in the accommodating holes of the upper layer 121C and the lower layer 122C, respectively, may be decreased. Therefore, volumes of the upper cavity area 121A and the lower cavity area 122A into which an ultraviolet ray curable resin is injected are decreased. Therefore, the optical lens production device 100 according to the exemplary embodiment illustrated in FIG. 3C may also experience the aforementioned effects by introducing the elastic member layers 121C and 122C.

According to the exemplary embodiment of the present invention, the elastic member layer 110 may be optionally used. When the lens forming unit 110, which does not include the elastic member layer 110, is used, the continuous injection of the photocurable resin may reduce the formation of the void. In another exemplary embodiment, air may be injected through the resin inlet 121B. When air is injected through the resin inlet 121B, the photocurable resins, which has already been injected into the lens forming unit 100, may be moved by the air. The photocurable resins, which are moved by air, move to a space where a void may be formed due to the contraction of the photocurable resin, thereby reducing the formation of the void.

Figure 4A:
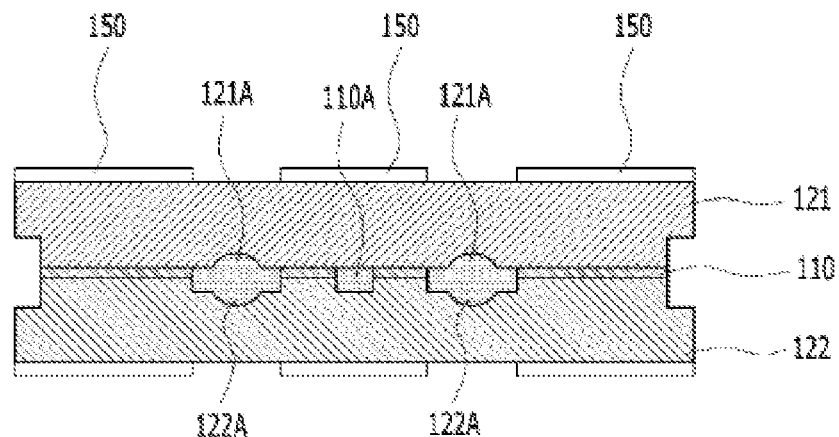
FIGS. 4A and 4B are views illustrating an exemplary embodiment of an exposure method of an optical lens production method according to the exemplary embodiment of the present invention.
Figure 4B:
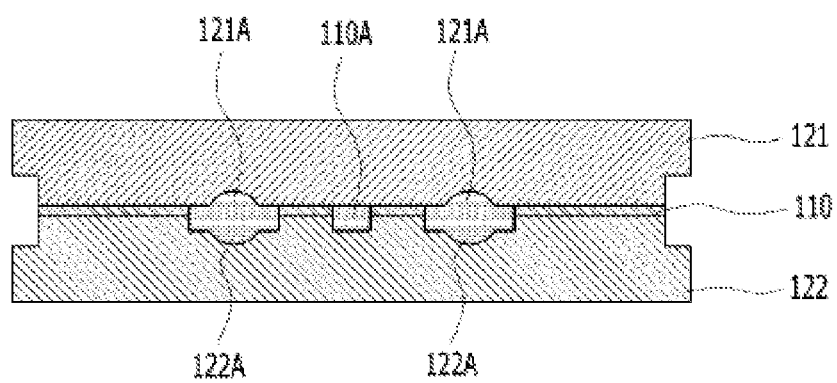

FIGS. 4A and 4B are views illustrating an exemplary embodiment of an exposure method of an optical lens production method according to the exemplary embodiment of the present invention.

As illustrated in FIGS. 4A and 4B, the optical lens production method according to the exemplary embodiment of the present invention may produce an optical lens by sequentially exposing the photocurable resin injected into the lens forming unit 100.

As illustrated in FIG. 4A, when the photocurable resin is injected into the lens forming unit 100 to a predetermined degree or higher, the optical lens production device may have a light shielding mask 150 for selectively exposing the lens forming unit 100. In the exemplary embodiment, the optical lens production device may further include a shielding mask forming machine (not illustrated) for additionally forming the light shielding mask 150 on the lens forming unit 100.

The optical lens production device may primarily form the light shielding mask 150 which selectively exposes a position corresponding to the upper or lower cavity area 121A or 122A. As illustrated in FIG. 4A, the light shielding mask 150 is not formed at portions where the upper cavity area 121A and the lower cavity area 122B are exposed, but the light shielding mask 150 may be formed at a portion where the channel 110A is exposed.

While FIG. 4A illustrates a state in which the light shielding masks 150 are formed directly on the upper mould 121 and the lower mould 122, additional layers may be formed between the light shielding mask 150 and the upper and lower moulds 121 and 122 in accordance with a design.

The shielding mask forming machine (not illustrated) for forming the light shielding mask 150 may be configured by various publicly known methods. As an example, the light shielding mask 150 may be formed of a light shielding film having a predetermined pattern. In this case, the shielding mask forming machine (not illustrated) may be configured as a device that temporarily attaches the film to the lens forming unit 100. The shielding mask forming machine may further include a device for removing the light shielding film 150 after the primary exposure.

In another exemplary embodiment, the light shielding mask 150 may be made of light shielding paint or resin that may block light from a light source (not illustrated). In this case, the shielding mask forming machine (not illustrated) may be configured as a device for applying the paint or the resin in a predetermined pattern. The shielding mask forming machine may further include a device for removing the applied paint or resin from the lens forming unit 100.

As described above, the predetermined pattern may mean a pattern that exposes only the upper and lower cavity areas 121A and 122A to the light source, and blocks the other portions (e.g., the channel 110A and/or the resin inlet 121B).

While FIG. 4A illustrates that the resin inlet 121B is shielded by the light shielding mask 150, the resin inlet 121B may be exposed to the outside in the case of an exemplary embodiment in which the photocurable resin is continuously injected through the resin inlet 121B during the exposure process. In other words, the light shielding mask 150 may not be present at least a part of the resin inlet 121B so that the resin inlet 121B is continuously connected with the resin injection apparatus and the photocurable resin may be injected.

FIG. 4A illustrates the exposure apparatus which is configured so that a plurality of light sources radiates light to the lens forming unit 100 at one time from upper and lower sides of the lens forming unit 100, but the exposure apparatus may be variously changed in accordance with a design.

For example, the exposure apparatus may be configured to radiate light only to one side of the upper and lower sides of the lens forming unit 100.

In addition, the exposure apparatus may be configured to radiate light only to at least a part of the lens forming unit 100 at one time. In a case in which the exposure apparatus may not radiate light to the entire lens forming unit 100 at one time, but may radiate light only to a part of the lens forming unit 100, the exposure apparatus and the lens forming unit 100 may be configured to move relative to each other. In this case, a transfer unit (not illustrated), which allows the exposure apparatus and the lens forming unit 100 to move relative to each other, may be installed to at least one of the exposure apparatus and the lens forming unit 100. The exposure method, which allows the exposure apparatus and the lens forming unit 100 to move relative to each other, will be described in more detail with reference to FIGS. 5 and 6.

In yet another exemplary embodiment, the exposure apparatus may be configured to turn on at least some of two or more light sources included in the exposure apparatus in a stepwise manner. According to the exemplary embodiment, the exposure apparatus may primarily turn on the light source, which is positioned at a position where the light source may radiate light to a portion exposed by the light shielding mask 150. After the light shielding mask 150 is removed, the exposure apparatus may secondarily turn on the remaining light sources.

Referring back to FIG. 4A, the primary exposure may be initiated in a state in which at least a part of the lens forming unit 100 is exposed by the light shielding mask 150. The upper cavity area 121A and the lower cavity area 122A, which are exposed by the light shielding mask 150 by the primary exposure, may be primarily cured.

When the upper cavity area 121A and the lower cavity area 122A are primarily cured, the photocurable resin begins to be contracted by photopolymerization as described above. The photocurable resins in the upper cavity area 121A and the lower cavity area 122A, which forms the optical lens, are contracted while being cured. In this case, the photocurable resin, which is not cured, is present in a region (e.g., the channel 110A) that is not exposed to light by the light shielding mask 150. If the photocurable resin in the channel 110A is cured at the same time when the resin in the cavity areas 121A and 122A is contracted while being cured, the cavity areas 121A and 122A cannot be supplemented with the resin, and as a result, there is a likelihood that a void will be formed in the cured resin in the cavity areas 121A and 122A. However, if some regions remain unexposed by the light shielding mask 150, the photocurable resin in the unexposed regions (e.g., the channel 110A) may be transferred to supplement the vacant space to the extent that the photocurable resin in the cavity areas 121A and 122A is contracted. Therefore, it is possible to prevent a void from being formed in the photocurable resin in the cavity areas 121A and 122A which will be an optical lens later, and to induce the void to be formed in the gate (connecting portions between the cavity areas and the channel) or the channel.

As illustrated in FIG. 4B, when the primary exposure step is completed, the light shielding mask 150 may be removed from the lens forming unit 100.

The light shielding mask 150 may be physically and/or chemically removed from the lens forming unit 100. For example, if the light shielding mask 150 is a light shielding film, the light shielding mask may be physically removed by stripping the light shielding film. Otherwise, if the shielding mask 150 is the light shielding paint or resin, the light shielding mask 150 may be removed from the lens forming unit 100 by physically and/or chemically washing or scraping away the light shielding paint or resin.

As illustrated in FIG. 4B, after the light shielding mask 150 is removed, the optical lens production device may secondarily expose the lens forming unit 100 to light. With the secondary exposure, all of the photocurable resins positioned in the gate and the channel sprue are cured, and the cured resin may be finally and completely ready to be ejected from the lens forming unit 100.

Figure 5:
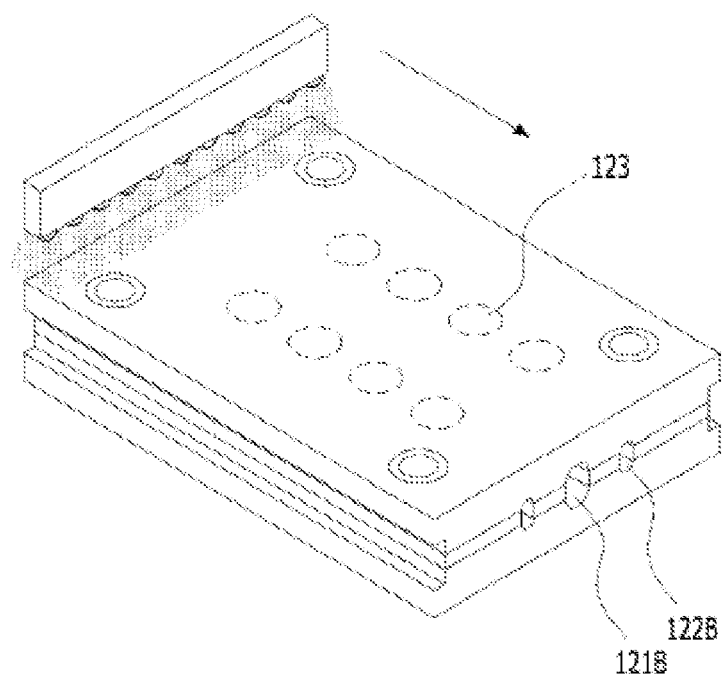
FIG. 5 is a view illustrating another exemplary embodiment of the exposure method of the optical lens production method according to the exemplary embodiment of the present invention.

FIG. 5 is a view illustrating another exemplary embodiment of the exposure method of the optical lens production method according to the exemplary embodiment of the present invention.

As illustrated in FIG. 5, the exposure apparatus and the lens forming unit 100 may be configured to move relative to each other. The exposure apparatus may be configured to radiate light to at least a part of the lens forming unit 100 when the exposure apparatus is turned on. In this case, at least one of the exposure apparatus and/or the lens forming unit 100 includes a transfer device, and may move relative to each other by the transfer device.

While FIG. 5 illustrates that the lens forming unit is placed in a horizontal direction and the light source radiates light from a vertically upper side of the lens forming unit, a light radiation angle of the light source and a position of the light source may be changed in accordance with a design.

In the exemplary embodiment of the present invention illustrated in FIG. 5, the two or more lens cavity areas (including the upper and lower cavity areas) are illustrated as being positioned at the same height, but the heights of the lens cavity areas included in the lens forming unit 100 may be different from each other. The related exemplary embodiment will be described in more detail with reference to FIG. 6.

Figure 6:
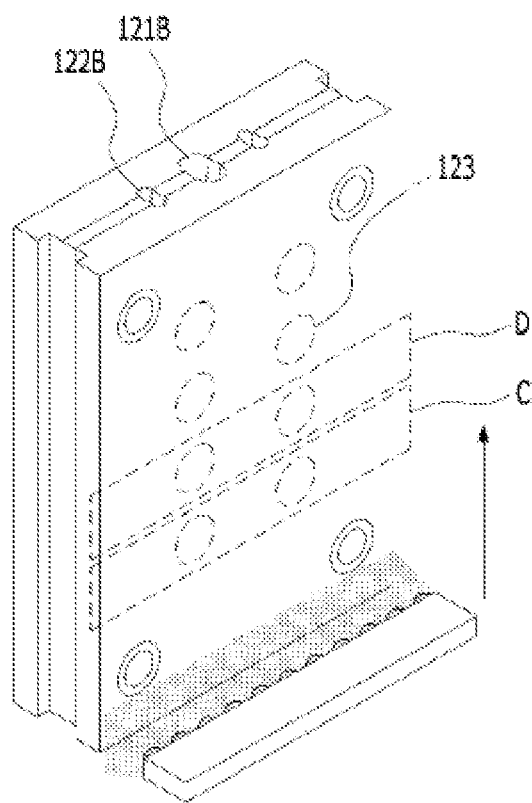
FIG. 6 is a view illustrating yet another exemplary embodiment of the exposure method of the optical lens production method according to the exemplary embodiment of the present invention.

FIG. 6 is a view illustrating yet another exemplary embodiment of the exposure method of the optical lens production method according to the exemplary embodiment of the present invention.

As illustrated in FIG. 6, the lens forming unit 100 may be formed so that the two or more lens cavity areas formed in the lens forming unit 100 have different height levels. FIG. 6 illustrates that the lens forming unit 100 vertically stands and the lens cavity areas included in the lens forming unit 100 are arranged in the height direction, but the lens forming unit 100 according to the exemplary embodiment of the present invention is not limited thereto. For example, the lens forming unit 100 may be formed so that an inclined surface is formed and the two or more cavity areas in the lens forming unit 100 have different height levels. In another example, the lens forming unit 100 may not have a flat plate shape, and may have any shape so that the cavity areas in the lens forming unit 100 have different height levels.

The 'height level' may mean a height in a vertically upward direction of the lens cavity areas. If two or more lens cavity areas have the same heights in the vertically upward direction, this may mean that the two or more lens cavity areas have the same height level.

As illustrated in FIG. 6, it can be said that the lens cavity areas included in region C all have the same height level. It can be said that the lens cavity areas included in region D all have the same height level. It can be said that the lens cavity areas included in region D have higher height levels than the lens cavity areas included in region C.

In the optical lens production device according to the exemplary embodiment of the present invention, the exposure apparatus (not illustrated) may cure the photocurable resins accommodated in the lens forming unit 100 while moving relative to the lens forming unit 100. In this case, the exposure apparatus (not illustrated) may move relative to the lens forming unit 100 so that the lens cavity area, which has a lower height level among the two or more lens cavity areas, may be exposed to light first.

For example, the exposure apparatus (not illustrated) may move relative to the lens forming unit 100 so as to radiate light to the lens cavity areas disposed in region C first, and then radiate light to the lens cavity areas disposed in region D after a sufficient amount of time has passed. In another exemplary embodiment, the exposure apparatus (not illustrated) may be fixed, and the lens forming unit 100 may move relative to the exposure apparatus.

In the exemplary embodiment, the exposure apparatus (not illustrated) may sequentially move so that the lens cavity areas in the lens forming unit 100 may be exposed to light in the order from the lens cavity area having the lowest height level to the lens cavity area having the highest height level.

When the exposure apparatus (not illustrated) and the lens forming unit 100 move relative to each other, the exposure apparatus (not illustrated) and the lens forming unit 100 may move relative to each other at a predetermined speed. Here, the predetermined speed may be set to a low speed enough to ensure a sufficient amount of exposure time for which the photocurable resins in the cavity areas, which are being currently exposed to light by the exposure apparatus (not illustrated) and have the same height level, may be cured. In another exemplary embodiment, the exposure apparatus (not illustrated) and the lens forming unit 100 may be temporarily stopped while moving relative to each other. For example, to ensure a sufficient amount of time for which the photocurable resins in the cavity areas, which are being currently exposed to light by the exposure apparatus (not illustrated) and have the same height level, may be cured, the exposure apparatus (not illustrated) and the lens forming unit 100 may stop moving relative to each other for a predetermined time.

As illustrated in FIG. 6, two or more lens cavity areas formed in the lens forming unit 100 may be connected to each other through the channels. The channels, which connect the two or more lens cavity areas, may be formed so that the resin is injected into the lens cavity area having a low height level through the lens cavity area having a high height level.

For example, as illustrated in FIG. 6, the lens cavity areas may be connected with the lens cavity areas, which are positioned at a one-step higher height level than the former lens cavity areas, through the channels. However, the lens cavity areas may be connected with the lens cavity areas which are positioned at a two-step higher level than the former lens cavity areas. For example, the lens cavity areas positioned at a height level D may be connected with not the lens cavity areas positioned at a height level C, but other lens cavity areas having a height level higher than the height level C.

FIG. 6 illustrates an exemplary embodiment in which the lens cavity areas are connected with the lens cavity areas, which are positioned immediately above the former lens cavity areas, through the channels, so that a continuous chain of the lens cavity areas is formed in a vertical direction. However, in accordance with a design, the lens cavity areas may be connected with the lens cavity areas which are positioned at not a vertically upper side of the former lens cavity areas, but other positions. In accordance with a design, an additional channel may be formed to connect the lens cavity areas having the same height level.

FIG. 6 illustrates the channels formed straight, but in accordance with a design, the channels, which connect the two or more lens cavity areas, may be formed in various shapes. For example, various types of channels such as a spiral channel or a curved channel may be formed. The channels generally connect two lens cavity areas, but may connect three or more lens cavity areas as necessary.

The resin inlet through which the resin is injected into the lens forming unit 100 may be formed at various positions. As an example, the resin inlet may be formed at an uppermost end of the lens forming unit 100, and directly connected with the lens cavity areas having the highest height level. In another exemplary embodiment, the resin inlet may be formed at an intermediate portion or a lowermost end of the lens forming unit 100 instead of the uppermost end of the lens forming unit 100. The resin inlet may be connected with one cavity area. In accordance with a design, one resin inlet may be connected with two or more cavity areas.

In the exemplary embodiment, in a case in which the resin inlet and the lens cavity areas are positioned at a long distance, an extended channel may be formed to connect the resin inlet and the lens cavity areas.

When the photocurable resin is injected into the lens forming unit 100 through the resin inlet, the photocurable resin is injected into the lens cavity area directly connected with the resin injection unit. The photocurable resin, which is injected into the lens forming unit 100, may be transferred to other lens cavity areas which are connected, through the channels, with the lens cavity areas connected with the resin injection unit.

The photocurable resin may be injected through the lens cavity areas existing in the lens forming unit 100 and through the channels that connect the lens cavity areas.

As described above, in the exposure step, the exposure apparatus (not illustrated) may expose the lens cavity areas to light first, which have a lower height level among the two or more lens cavity areas having different height levels.

When the lens cavity areas having a lower height level are exposed to light, a contraction reaction may occur due to photopolymerization as described above. In this case, the lens cavity areas having a higher height level are not yet exposed to light, and thus, the photocurable resin with which the lens cavity areas are filled is not exposed to light and may remain in a liquid phase.

In this case, the photocurable resin with which the lens cavity area having a higher height level is filled is about to be transferred downward by gravity, and may be transferred to the lens cavity area having a lower height level through the channel. When a volume of the photocurable resin existing in the lens cavity area having a lower height level is decreased, a space into which the photocurable resin existing in the lens cavity area having a higher height level may flow is created, such that the space is filled with the photocurable resin flowing into the created space. As a result, it is possible to reduce a likelihood that a void will be formed in the lens cavity area.

As illustrated in FIG. 6, the exposure apparatus may expose region D to light first, and then sequentially expose region C, and the other lens cavity areas having a higher height level to light.

In the sequential exposure step, the resin may be continuously injected into the lens forming unit 100 through the resin inlet.

In another exemplary embodiment, the exposure apparatus may determine the exposure order based on other factors instead of the height level.

For example, the lens cavity areas existing in the lens forming unit 100 may be classified based on topology with the resin inlet. For example, it can be said that the lens cavity areas directly connected with the resin inlet are disposed at a one hop distance, the lens cavity areas, which are connected between the resin inlet and the lens cavity area through one lens cavity area, are disposed at a two hop distance, and the lens cavity areas, which are connected between the resin inlet and a lens inlet through n lens cavity areas, are disposed at a n+1 hop distance.

In this case, the exposure apparatus may perform the exposure step in the order from the lens cavity areas disposed at a longer hop distance to the lens cavity areas disposed at a shorter hop distance.

In this case, the photocurable resin in the lens cavity areas disposed at a longer hop distance begins to be cured first, and the resin, which is not yet cured, may move from the lens cavity areas disposed at a shorter hop distance to the lens cavity areas disposed at a longer hop distance.

The two or more lens cavity areas, which are simultaneously exposed to light at one time, do not necessarily have the same hop distance, but the lens cavity areas having different hop distances may be simultaneously exposed to light in accordance with a phase relationship with the resin inlet.

In this case, in the exposure step, the resin may continuously flow into the lens forming unit 100 through the resin inlet, and because of pressure generated when the resin continuously flows in, the resin, which is not yet cured, may move in the order from the lens cavity areas disposed at a shorter hop distance to the lens cavity areas disposed at a longer hop distance.

The phase relationship of the lens cavity areas which are connected to each other in the lens forming unit 100 may also be set based on the other lens cavity areas instead of the lens cavity area where the resin inlet 121B (sprue) is present. For example, any lens cavity area, which is not directly connected with the resin inlet 121B, may be set to be positioned at a zero hop distance. Similar to the aforementioned description, it can be defined that the lens cavity areas, which are connected directly with any lens cavity area (zero hop) through the channel, are disposed at a one hop distance, and the lens cavity areas, which are connected between the lens cavity area (zero hop) and the lens cavity area through one lens cavity area, are disposed at a two hop distance.

As described above, the lens cavity areas in the lens forming unit 100 may be sequentially exposed to light in the order from the lens cavity area having a larger hop number to the lens cavity area having a smaller hop number. In this case, the photocurable resins positioned in the lens cavity areas having a smaller hop number move to the lens cavity areas having a larger hop number, thereby reducing a likelihood that a void will be formed.

In this case, the lens cavity areas, which are defined to a zero hop, may have a relatively larger volume than the other lens cavity areas.

Otherwise, a separate space (resin reservoir), which is created to store the photocurable resin, is defined as a zero hop, instead of the lens cavity area, and the lens cavity areas may be sequentially exposed to light in the order from the lens cavity area having a larger hop number to the lens cavity area having a smaller hop number, as described above.

Figure 7:
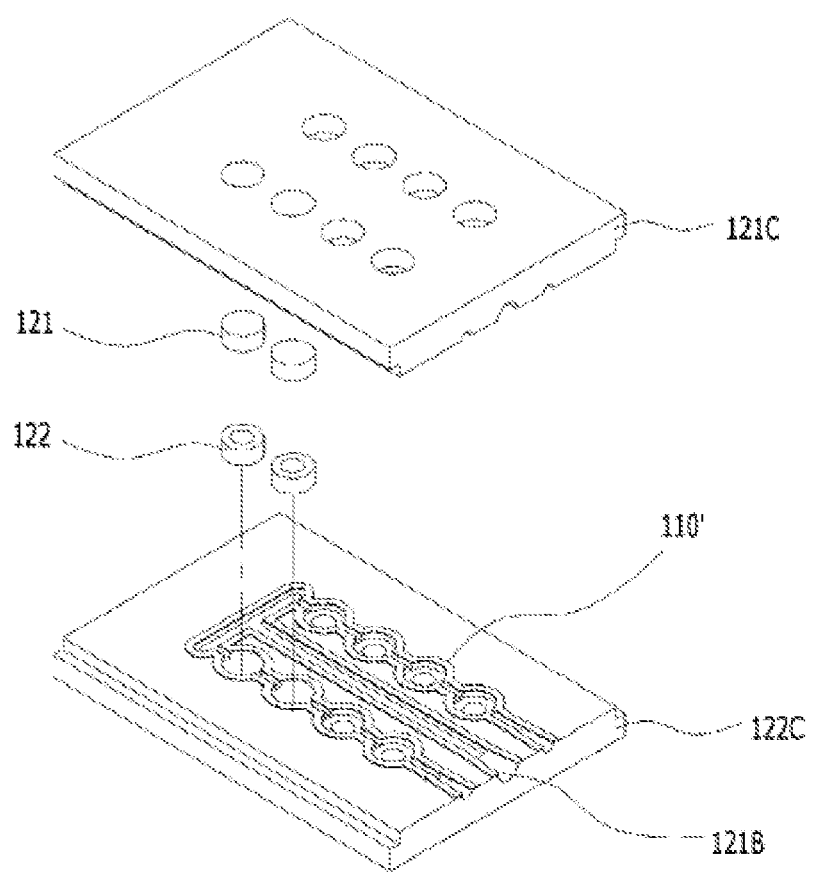
FIG. 7 is a view illustrating an optical lens production device 100 according to yet another exemplary embodiment of the present invention.

FIG. 7 is a view illustrating an optical lens production device 100 according to yet another exemplary embodiment of the present invention.

As illustrated in FIG. 7, the optical lens production device 100 may include an upper core 121 and a lower core 122 which form lens cavity areas 121A and 122A. The upper core 121 and the lower core 122 may have a cylindrical shape, and may be inserted into an upper plate 121C and a lower plate 122C, respectively. However, the shapes of the upper core 121 and the lower core 122 illustrated in FIG. 7 is for an illustration purpose, and the upper core 121 and the lower core 122 may have various shapes in accordance with a shape and a size of a lens to be produced. For example, the upper core 121 and the lower core 122 may have various shapes such as a rectangular parallelepiped shape, a conical shape, and a hemispherical shape for forming the lens cavity areas 121A and 122A.

The upper plate 121C and the lower plate 122C may have accommodating grooves for accommodating the upper core 121 and the lower core 122. The accommodating groove may be formed to correspond to the shape of the upper core 121 or the lower core 122. For example, the accommodating groove formed in the upper plate 121C may be formed as an aperture having an inner diameter corresponding to an outer surface of the upper core 121. The accommodating groove formed in the lower plate 122C may be formed as an aperture having an inner diameter corresponding to an outer surface of the lower core 122. In a case in which the accommodating grooves, which are formed in the upper plate 121C and the lower plate 122C, respectively, are formed as the apertures formed to correspond to the outer surfaces of the upper core 121 and the lower core 122, the upper core 121 and the lower core 122 may be fitted into the upper plate 121C and the lower plate 122C, respectively. The upper plate 121C and the lower plate 122C may be formed to align and fix the upper core 121 and the lower core 122.

Both of the upper plate 121C and the lower plate 122C may be made of a material that allows light having a wavelength, which may cure the photocurable resin, to pass therethrough. For example, in a case in which an ultraviolet ray curable resin is used, both of the upper plate 121C and the lower plate 122C may be made of a material that allows an ultraviolet ray to pass therethrough.

To maintain a state in which optical axes of the upper cavity area 121B and the lower cavity area 122B are aligned, a fixing column (not illustrated) may be formed on the lower plate 122C, and a fixing groove (not illustrated) may be formed in the upper plate 121C. That is, the fixing column (not illustrated) and the fixing groove (not illustrated) may be formed to fix a relative position between the upper plate 121C and the lower plate 122C. The fixing column (not illustrated) and the fixing groove (not illustrated) may have any shape for fixing the upper plate 121C and the lower plate 122C. FIG. 7 illustrates four fixing columns (not illustrated) and four fixing grooves (not illustrated) in pairs, but any number of fixing columns (not illustrated) and any number of fixing grooves (not illustrated) may be present in pairs. For example, two fixing columns (not illustrated) and two fixing grooves (not illustrated) may be present in pairs in a diagonal direction. Otherwise, four or more fixing columns (not illustrated) and four or more fixing grooves (not illustrated) may be present in pairs.

As illustrated in FIGS. 1 to 6, an elastic member 110 may be present between the upper mould 121 and the lower core 122. The elastic member 110 may be present between the upper mould 121 and the lower core 122.

Meanwhile, in yet another exemplary embodiment illustrated in FIG. 7, the lens production device 100 may not separately include the elastic member 110 or a layer made of an elastic member.

Instead, in the lens production device 100, any portion, which encompasses the upper cavity area 121B and the lower cavity area 122B, may be made of a material having elastic force, and may serve as the aforementioned elastic member 110. For example, the upper cavity area 121B and the lower cavity area 122B may be encompassed by the upper core 121, the lower core 122, a gate, an inner wall of the accommodating groove formed in the upper plate 121C, and an inner wall of the accommodating groove formed in the lower plate 122C. In an alternative exemplary embodiment, at least any portion of the lens production device 100, among the upper core 121, the lower core 122, the gate, the inner wall of the accommodating groove formed in the upper plate 121C, and the inner wall of the accommodating groove formed in the lower plate 122C which encompass the upper cavity area 121B and the lower cavity area 122B, may be formed as an elastic portion 110'.

In a case in which any portion, which encompasses the upper cavity area 121B and the lower cavity area 122B, is made of a material having elastic force, the portion having elastic force is contracted when the photocurable resin is contracted during the curing process, thereby reducing volumes in the upper cavity area 121B and the lower cavity area 122B. As a result, it is possible to reduce a likelihood that a void will be formed in the produced lens.

For example, the elastic portion 110' may be formed to encompass at least a part of an extended line of an outer surface of the upper core 121 or the lower core 121. As illustrated in FIG. 7, the upper core 121 and the lower core 122 may be vertically disposed in a state in which central axes of the upper core 121 and the lower core 122 are aligned. Here, when the outer surface of the upper core 121 or the lower core 122 is extended, an imaginary cylindrical space may be formed, which has the same diameter as the upper core 121 or the lower core 122, and has a height corresponding to a length between the upper core 121 and the lower core 122. The elastic portion 110' may be formed to encompass at least a part of the cylindrical space.

Referring to FIG. 7, the upper core 121 and the lower core 122 are formed in a cylindrical shape, and thus, an imaginary shape, which is formed by the extended line of the outer surface of the upper core 121 or the lower core 122, is also formed as a cylindrical space, but this is for an illustration purpose. That is, the imaginary shape, which is formed by the extended line of the outer surface of the upper core 121 or the lower core 122, may have various shapes in accordance with a shape of the upper core 121 or the lower core 122. For example, the imaginary shape, which is formed by the extended line of the outer surface of the upper core 121 or the lower core 122, may have a multi-sided column shape.

In the exemplary embodiment illustrated in FIG. 7, the elastic portion 110' may be formed to encompass the remaining portion of the cylindrical space existing between the upper core 121 and the lower core 122 except for the gate portion connected with adjacent cavity areas. In addition, the elastic portion 110' may be formed to encompass a movement route of the photocurable resin, such as a gate and a runner. That is, the elastic portion 110' may extend upward from the lower plate 122C so as to encompass a space in the lower plate 122C through which the photocurable resin passes.

As illustrated in FIG. 7, the elastic portion 110' may extend vertically upward from the lower plate 122C. The structure in which the elastic portion 110' is formed separately from the lower plate 122C is substantially identical to the structure of the exemplary embodiment as described above with reference to FIG. 2B.

While FIG. 7 illustrates the exemplary embodiment in which the elastic portion 110' extends from the lower plate 122C, the elastic portion 110' may extend from the upper plate 121C. That is, the elastic portion 110' may extend downward from the upper plate 121C, and the elastic portion 110' may be formed to encompass the movement route through which the photocurable resin moves in the lens production device 100.

A height of the elastic portion 110' may be determined in the same manner as the height of the aforementioned elastic member 110. That is, to reduce a void in the lens produced by the lens production device 100, an appropriate height may be selected in accordance with elastic force of a material that has elasticity and constitutes the elastic portion 110'. The height of the elastic portion 110' may mean a height to which the elastic portion 110' protrudes downward or upward from the upper plate 121C or the lower plate 122C. The height of the elastic portion 110' illustrated in FIG. 7 may be an exaggerated height. That is, in accordance with a design, the actual height of the elastic portion 110' may be a height that is difficult to be observed with the naked eye. For example, the elastic portion 110' may have an arbitrary height of 500 μm or lower.

The elastic portion 110' may be made of any material having elastic force. The elastic portion 110' may be made of a material different from a material of the lower plate 122C. Otherwise, the elastic portion 110' may be made of the same material as the lower plate 122C, and may also be formed integrally with the lower plate 122C.

Figure 8:
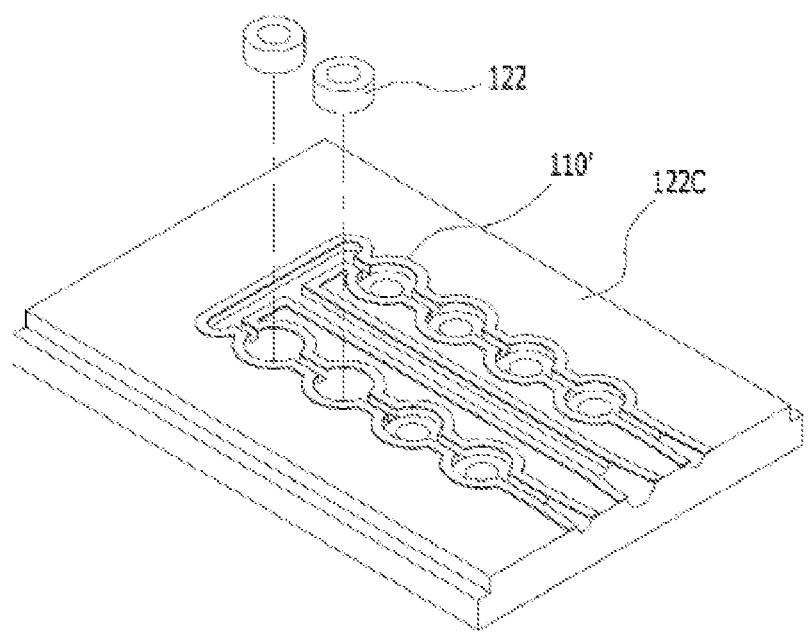
FIG. 8 is a view illustrating a lower plate 122C of the lens production device 100 according to the exemplary embodiment of the present invention.

FIG. 8 is a view illustrating the lower plate 122C of the lens production device 100 according to the exemplary embodiment of the present invention.

As illustrated in FIG. 8, the elastic portion 110' may be formed on the lower plate 122C. The elastic portion 110' may be formed to encompass the route through which the photocurable resin moves in the lower plate 122C in order to prevent the photocurable resin from leaking to the outside of the upper cavity area 121B and the lower cavity area 122B. In addition, the elastic portion 110' may be formed to maintain overall the same height.

Figure 9:
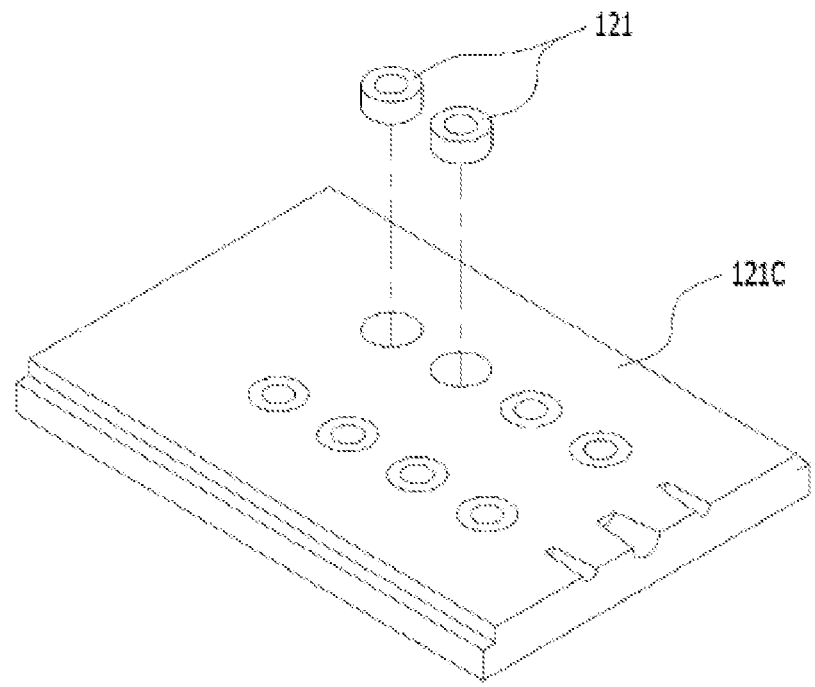
FIG. 9 is a view illustrating an upper plate 121C of the lens production device 100 according to the exemplary embodiment of the present invention.

FIG. 9 is a view illustrating the upper plate 121C of the lens production device 100 according to the exemplary embodiment of the present invention.

As illustrated in FIG. 9, a position of the upper core 121 may be fixed as the upper core 121 is accommodated in the accommodating groove accommodated in the upper plate 121C. As illustrated in FIG. 9, the movement route (channel, runner, gate, and etc.) through which the photocurable resin moves may be formed only in the lower plate 122C.

That is, in other words, a movement passage through which the photocurable resin moves in the lens production device 100 is formed only in the lower plate 121C, and as a result, the movement passage of the photocurable resin may be formed at a lower side of a parting surface (a surface where the upper plate 121C and the lower plate 122C are physically separated).

Figure 10:
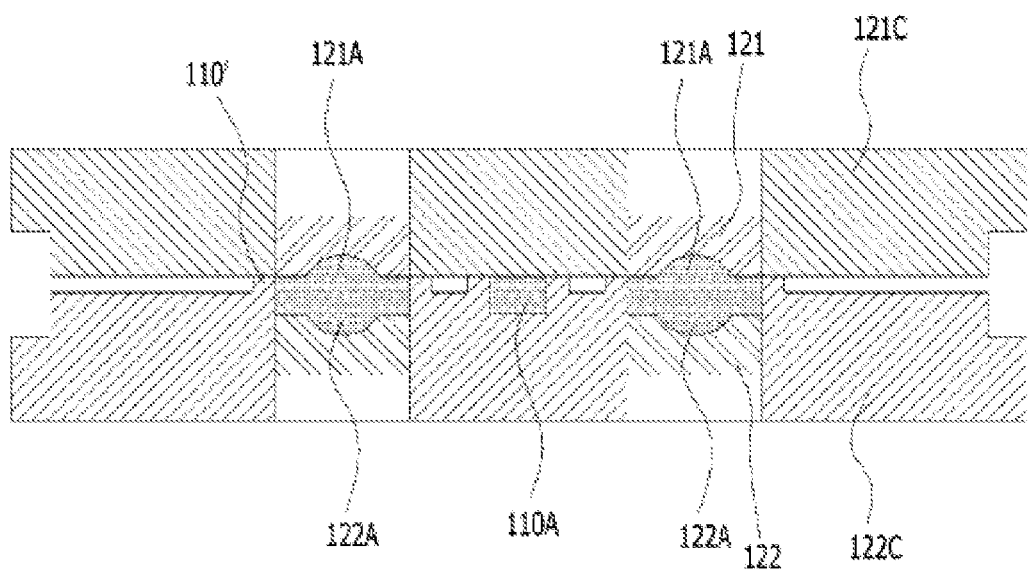
FIG. 10 is a cross-sectional view of the lens production device 100 according to the exemplary embodiment of the present invention.

FIG. 10 is a cross-sectional view of the lens production device 100 according to the exemplary embodiment of the present invention.

As illustrated in FIG. 10, the upper core 121 and the lower core 122 may be accommodated and aligned in the accommodating grooves of the upper plate 121C and the lower plate 122C, respectively.

As illustrated in FIG. 10, the elastic portion 110' is formed not only in the upper cavity area 121A and the lower cavity area 122A by which the lens is actually formed, but also at the periphery of the channel 110A through which the photocurable resin passes. The elastic portion 110' is formed to encompass a passageway through which the photocurable resin moves in the lens production device 100 without exception, thereby preventing the photocurable resin from leaking. Since the elastic portion 110' is made of a material having elastic force, the elastic portion 110' is in close contact with the upper plate 121C and the lower plate 122C even when a level difference exists between the upper plate 121C and the lower plate 122C during a producing process, and as a result, it is possible to prevent a leak of the photocurable resin.

When the photocurable resin is injected through the resin inlet, the channel 110A through which the photocurable resin passes, the upper cavity area 121A, and the lower cavity area 122A may be filled with the photocurable resin.

When the photocuring process begins, the photocurable resin with which the channel 110A, the upper cavity area 121A, and the lower cavity area 122A are filled may be contracted. Therefore, the elastic portion 110' may also be contracted by receiving external force in the height direction. As a result, a volume of a portion in the lens production device 100, which is filled with the resin, is decreased, thereby reducing a probability that a void will be formed in the lens.

As described above, all of the upper core 121, the lower core 122, the upper plate 121C, and the lower plate 122C may be made of a material that may allow light capable of curing the photocurable resin to pass therethrough. For example, all of the upper core 121, the lower core 122, the upper plate 121C, and the lower plate 122C may be made of a transparent material.

When the resin is completely injected, a part of the lens production device 100 is masked and then sequentially exposed to light as described above, or the cavity areas in the lens production device 100 may be sequentially exposed to light as the lens production device 100 and the light source move relative to each other.

It should be understood that the particular order of the steps of the disclosed processes or the layered structure is an illustrative approach. It should also be understood that the particular order of the steps of the disclosed processes or the layered structure may be rearranged based on the priority of design within the scope of the present invention. The accompanying method claims provide elements associated with various steps as the illustrative order, but the present invention is not limited to the disclosed particular order or the layered structure.

The description about the suggested exemplary embodiments is provided so that a person with ordinary skill in the art to which the present invention pertains may use or carry out the present invention. Various modifications from the exemplary embodiments will be obvious to the person skilled in the art, and general principles defined herein may be applied to other exemplary embodiments without departing from the scope of the present invention. Accordingly, the present invention is not limited to the exemplary embodiments suggested herein, but should be construed within the widest scope that complies with the principles suggested herein and novel features.

Contents related to the best mode for invention has been described above.

INDUSTRIAL APPLICABILITY

The present invention may be used in the field of producing an optical lens.

What is claimed is:

1. An optical lens production device comprising:
an upper plate which has one or more upper cavity areas for forming an optical lens and can receive at least one upper core;
a lower plate which has one or more lower cavity areas for forming the optical lens and can receive at least one lower core; and
an elastic portion which is formed to encompass at least a part of an extended line of an outer surface of the upper core or the lower core and extend from the upper plate or the lower plate, and wherein the elastic portion comprises a gate which is formed to allow a resin to be injected into at least one of the upper cavity area and the lower cavity area.

2. The optical lens production device of claim 1,
wherein the upper plate or the lower plate has an accommodating groove for accommodating and aligning the upper core or the lower core; and
wherein the elastic portion extends from the upper plate or the lower plate.

3. The optical lens production device of claim 1, wherein the elastic portion is formed to encompass a route through which the resin moves in the optical lens production device.

4. The optical lens production device of claim 1, wherein the elastic portion is formed to encompass a boundary between the upper cavity area and the lower cavity area.

5. The optical lens production device of claim 1, further comprising:
a pressing apparatus which exerts a force for compressing the elastic portion after the resin is injected into at least one of the upper cavity area and the lower cavity area.

6. The optical lens production device of claim 1, wherein the elastic portion is sized and dimensioned to be compressed in an amount sufficient to thereby reduce formation of a void caused by a decrease in resin volume as the resin solidifies.

7. The optical lens production device of claim 1, wherein at least one of the upper and lower plates is capable of having a scattering material applied, and wherein the scattering material prevents light from being concentrated on a part of the resin.

8. The optical lens production device of claim 1, further comprising:
a scattering layer which prevents light from being concentrated on a part of the resin.

9. A method for producing an optical lens comprising:
disposing an upper plate which has at least one upper cavity area for forming an optical lens and can receive at least one upper core;
disposing a lower plate which has at least one lower cavity area for forming the optical lens and can receive at least one lower core; and
disposing an elastic portion which is formed to encompass at least a part of an extended line of an outer surface of the upper core or the lower core and extend from the upper plate or the lower plate, wherein the elastic portion comprises a gate which is formed to allow a resin to be injected into at least one of the upper cavity area and the lower cavity area.

* * * * *